(12) United States Patent
Lu

(10) Patent No.: US 9,847,719 B2
(45) Date of Patent: Dec. 19, 2017

(54) POWER SUPPLIER FOR GENERATING A SUPPLY VOLTAGE, POWER SUPPLY SYSTEM, AND VOLTAGE ADJUSTMENT METHOD

(71) Applicant: INTEL CORPORATION, Santa Clara, CA (US)

(72) Inventor: Ming-Xiang Lu, New Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/828,749

(22) Filed: Aug. 18, 2015

(65) Prior Publication Data
US 2016/0373007 A1 Dec. 22, 2016

(30) Foreign Application Priority Data

Jun. 18, 2015 (TW) .............................. 104119716 A

(51) Int. Cl.
*H02M 1/36* (2007.01)
*H02M 1/00* (2006.01)
*H02M 3/158* (2006.01)

(52) U.S. Cl.
CPC ............ *H02M 3/158* (2013.01); *H02M 1/36* (2013.01); *H02M 2001/0032* (2013.01); *Y02B 70/16* (2013.01)

(58) Field of Classification Search
CPC ......... H02M 2001/0045; H02M 3/156; H02M 3/158

(Continued)

(56) References Cited

U.S. PATENT DOCUMENTS 5,867,379 A * 2/1999 Maksimovic ....... H02M 1/4225
323/222
8,816,664 B2 8/2014 Fujii et al.
(Continued)

FOREIGN PATENT DOCUMENTS

CN 1881763 A 12/2006
CN 101714817 A 5/2010
(Continued)

OTHER PUBLICATIONS

Notification of Transmittal of the International Search Report and the Written Opinion of the International Searching Authority issued for International Patent Application No. PCT/US2016/037414, dated Sep. 12, 2016.

(Continued)

*Primary Examiner* — Jeffrey Gblende
*Assistant Examiner* — David A. Singh
(74) *Attorney, Agent, or Firm* — Blakely, Sokoloff, Taylor & Zafman LLP

(57) ABSTRACT

A power supplier for generating a supply voltage includes a PWM signal generator, a power conversion circuit, and first and second error amplifiers. The PWM signal generator generates at least one switching signal according to a voltage error signal. The power conversion circuit generates a switching voltage to an inductor according to the at least one switching signal so as to generate the supply voltage. The first error amplifier detects the difference between a positive voltage signal and a reference voltage. The second error amplifier detects the difference between a negative voltage signal and a ground voltage. Output terminals of the first and second error amplifiers are coupled to a first node. The voltage error signal is generated at the first node. The PWM signal generator modulates a duty cycle of the switching signal according to the variation of the voltage error signal.

15 Claims, 4 Drawing Sheets

(58) Field of Classification Search
USPC .......................................................... 323/271
See application file for complete search history.

(56) References Cited

U.S. PATENT DOCUMENTS

| | | | |
|---|---|---|---|
| 9,054,583 B2 | 6/2015 | Nagasawa et al. | |
| 2006/0055387 A1 | 3/2006 | Steele | |
| 2006/0091872 A1* | 5/2006 | Matsuura | H02M 3/156 323/283 |
| 2006/0152874 A1* | 7/2006 | Young | H02M 1/32 361/93.1 |
| 2006/0197509 A1 | 9/2006 | Kanamori et al. | |
| 2008/0024099 A1 | 1/2008 | Oki et al. | |
| 2008/0136383 A1 | 6/2008 | Hasegawa et al. | |
| 2012/0256685 A1 | 10/2012 | DelPapa et al. | |
| 2013/0027012 A1* | 1/2013 | Huang | H02M 3/156 323/283 |
| 2013/0258731 A1 | 10/2013 | Xu et al. | |
| 2014/0015580 A1 | 1/2014 | Chang | |
| 2016/0062375 A1* | 3/2016 | Houston | G05F 1/56 323/280 |
| 2016/0111950 A1* | 4/2016 | Duncan | G05F 1/59 323/268 |
| 2016/0261194 A1* | 9/2016 | Lam | H02M 3/156 |

FOREIGN PATENT DOCUMENTS

| | | |
|---|---|---|
| CN | 101997408 | 3/2011 |
| CN | 103532187 | 1/2014 |
| CN | 103780094 | 5/2014 |
| TW | 200830680 | 7/2008 |
| TW | 201216041 | 4/2010 |
| TW | M472358 | 2/2014 |

OTHER PUBLICATIONS

Search Report for counterpart Taiwan Application No. 104119716, 1 page, dated Mar. 3, 2016.

* cited by examiner

POWER SUPPLIER FOR GENERATING A SUPPLY VOLTAGE, POWER SUPPLY SYSTEM, AND VOLTAGE ADJUSTMENT METHOD

CROSS REFERENCE TO RELATED APPLICATIONS

This Application claims priority of Taiwan Patent Application No. 104119716, filed on Jun. 18, 2015, the entirety of which is incorporated by reference herein.

BACKGROUND OF THE INVENTION

Field of the Invention

The invention relates to a power supplier, and more particularly to a power supplier which is capable of compensating for voltage drop occurring on power lines disposed between the power supplier and a load, such that an input voltage of the load is kept at an expected level.

Description of the Related Art

A power supplier provides the required power of a load (such as a motherboard, a portable device etc.) The power supplier provides the power to the load through power lines on a printed circuit board. However, equivalent resistance-inductance-capacitance (RLC) circuits may be formed due to the electrical features of the power lines. When a current flows through one equivalent RLC circuit, voltage drop occurs on one power line, which causes an error in the input voltage received by the load. When the current flowing through the equivalent RLC circuit is larger, the error in the input voltage of the load becomes greater.

BRIEF SUMMARY OF THE INVENTION

An exemplary embodiment of a power supplier is provided. The power supplier generates a supply voltage between a positive voltage output terminal and a negative voltage output terminal. The power supplier comprises a pulse width modulation (PWM) signal generator, a power conversion circuit, a first error amplifier, and a second error amplifier. The PWM signal generator generates at least one switching signal according to a voltage error signal. The power conversion circuit is coupled to the positive voltage output terminal and the negative voltage output terminal and comprises an inductor. The power conversion circuit generates a switching voltage to the inductor according to the at least one switching signal so as to generate the supply voltage between the positive voltage output terminal and the negative voltage output terminal. The first error amplifier has a positive input terminal receiving a reference voltage and a negative input terminal receiving a positive voltage signal and detects the difference between the positive voltage signal and the reference voltage. An output terminal of the first error amplifier is coupled to a first node. The second error amplifier has a positive input terminal receiving a negative voltage signal and a negative input terminal receiving a ground voltage and detects the difference between the negative voltage signal and the ground voltage. An output terminal of the second error amplifier is coupled to the first node. The voltage error signal is generated at the first node. The PWM signal generator modulates a duty cycle of the at least one switching signal according to a variation of the voltage error signal.

An exemplary embodiment of a power supply system is provided. The power supply system comprises a load and a power supplier. The load has a positive voltage input terminal and a negative voltage input terminal. The power supplier generates a supply voltage between a positive voltage output terminal and a negative voltage output terminal of the power supplier. The positive voltage output terminal and the negative voltage output terminal of the power supplier are respectively coupled to the positive voltage input terminal and the negative voltage input terminal of the load. The power supplier comprises a pulse width modulation (PWM) signal generator, a power conversion circuit, a first error amplifier, and a second error amplifier. The PWM signal generator generates at least one switching signal according to a voltage error signal. The power conversion circuit is coupled to the positive voltage output terminal and the negative voltage output terminal and comprises an inductor. The power conversion circuit generates a switching voltage to the inductor according to the at least one switching signal so as to generate the supply voltage between the positive voltage output terminal and the negative voltage output terminal. The first error amplifier has a positive input terminal receiving a reference voltage and a negative input terminal receiving a positive voltage signal and detects the difference between the positive voltage signal and the reference voltage. The positive voltage signal is related to a voltage at the positive voltage input terminal of the load. An output terminal of the first error amplifier is coupled to a first node. The second error amplifier has a positive input terminal receiving a negative voltage signal and a negative input terminal receiving a ground voltage and detects the difference between the negative voltage signal and the ground voltage. The negative voltage signal is related to the voltage at the negative voltage input terminal of the load. An output terminal of the second error amplifier is coupled to the first node. The voltage error signal is generated at the first node, and the PWM signal generator modulates a duty cycle of the at least one switching signal according to a variation of the voltage error signal.

An exemplary embodiment of a voltage adjustment method for adjusting a supply voltage is provided. A power supply generates the supply voltage between a positive voltage output terminal and a negative voltage output terminal of the power supply. A positive voltage input terminal and a negative voltage input terminal of a load are respectively coupled to the positive voltage output terminal and the negative voltage output terminal of the power supply. The voltage adjustment method comprises the steps of performing a soft-start operation on the power supplier to generate the supply voltage; determining whether the load is a light load; the power supplier entering a continuous current mode when it is determined that the load is not a light load; at the continuous current mode, determining whether a remote detection operation is enabled; when the remote detection operation is enabled, and when there is voltage drop occurring in the negative voltage input terminal, modulating a duty cycle of at least one switching signal so as to adjust the supply voltage, thereby keeping the voltage difference between the positive voltage input terminal and the negative voltage input terminal of the load at a predetermined level.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
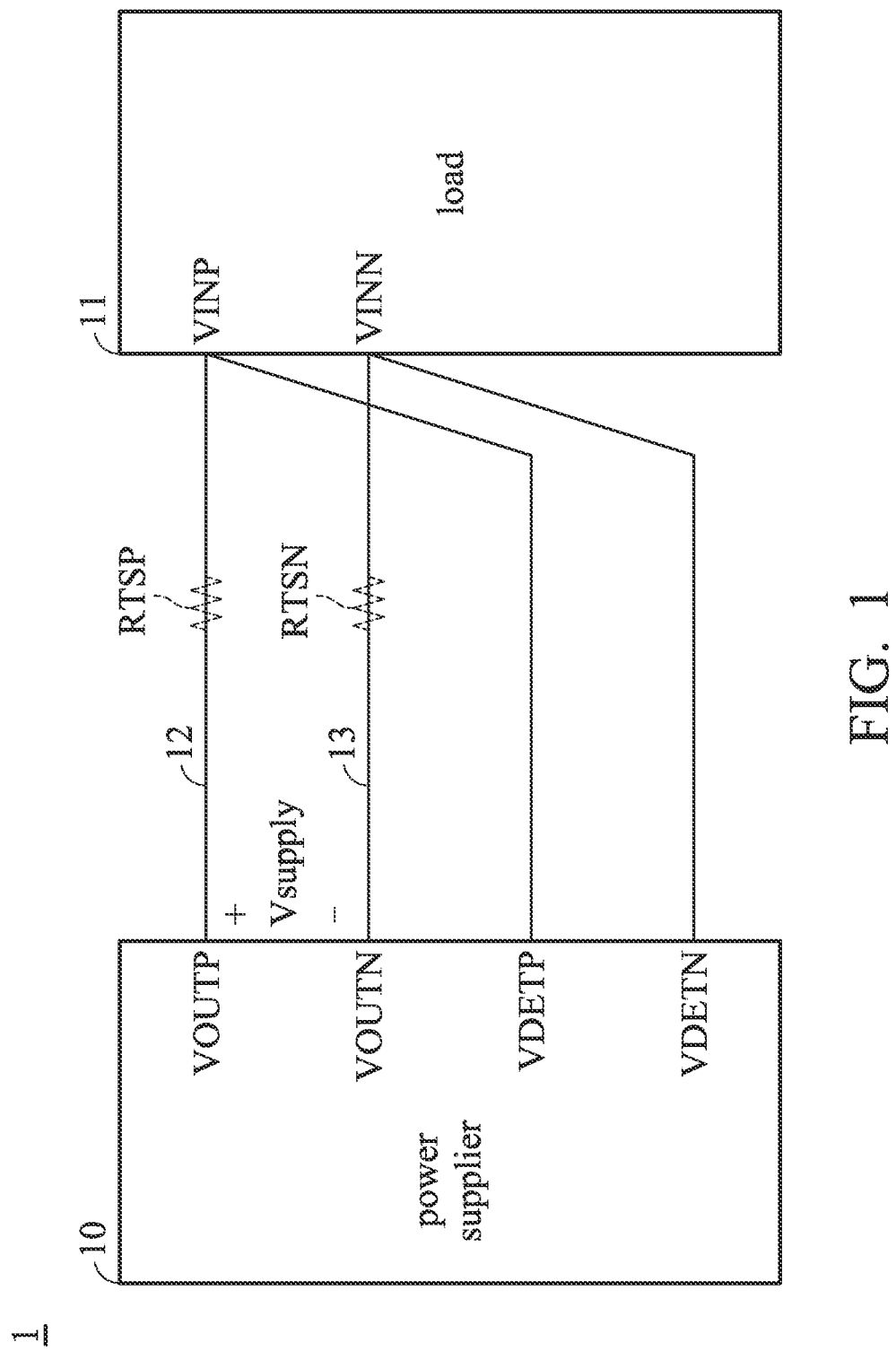
FIG. 1 shows an exemplary embodiment of a voltage supply system.

FIG. 1 shows an exemplary embodiment of a power supply system. As shown in FIG. 1, the power supply system 1 comprises a power supplier 10 and a load 11 powered by the power supplier 10. In the embodiment, the load 11 can be implemented by a motherboard, a display card, a USB, a transceiver, a wireless power transmission system, a portable device etc. The power supplier 10 has a positive voltage output terminal VOUTP and a negative voltage output terminal VOUTN. The power supplier generates a supply voltage Vsupply between the positive voltage output terminal VOUTP and the negative voltage output terminal VOUTN. The load 11 has a positive voltage input terminal VINP and a negative voltage input terminal VINN. In FIG. 1, power lines 12 and 13 are disposed on a printed circuit bard (PCB) disposed between the power supplier 10 and the load 11. The power line 12 is coupled between the positive voltage output terminal VOUTP of the power supplier 10 and the positive voltage input terminal VINP of the load 11, while the power line 13 is coupled between the negative voltage output terminal VOUTN of the power supplier 10 and the negative voltage input terminal VINN of the load 11. The supply voltage Vsupply is transmitted to the load 11 through the power lines 12 and 13. In FIG. 1, the resistors RTSP and RTSN represented by dotted lines are parasitic resistances of the lines 12 and 13, respectively. The power supplier 10 further has a positive voltage detection terminal VDETP and a negative voltage detection terminal VDETN which are respectively coupled to the positive voltage input terminal VINP and the negative voltage input terminal VINN. Through the positive voltage detection terminal VDETP and the negative voltage detection terminal VDETN, the power supplier 10 detects the voltage(s) at the positive voltage input terminal VINP and/or the negative voltage input terminal VINN for determining whether voltage drop occurs. The power supplier 10 adjusts the supply voltage Vsupply according to the determination result for compensating for the voltage drop.

Figure 2:
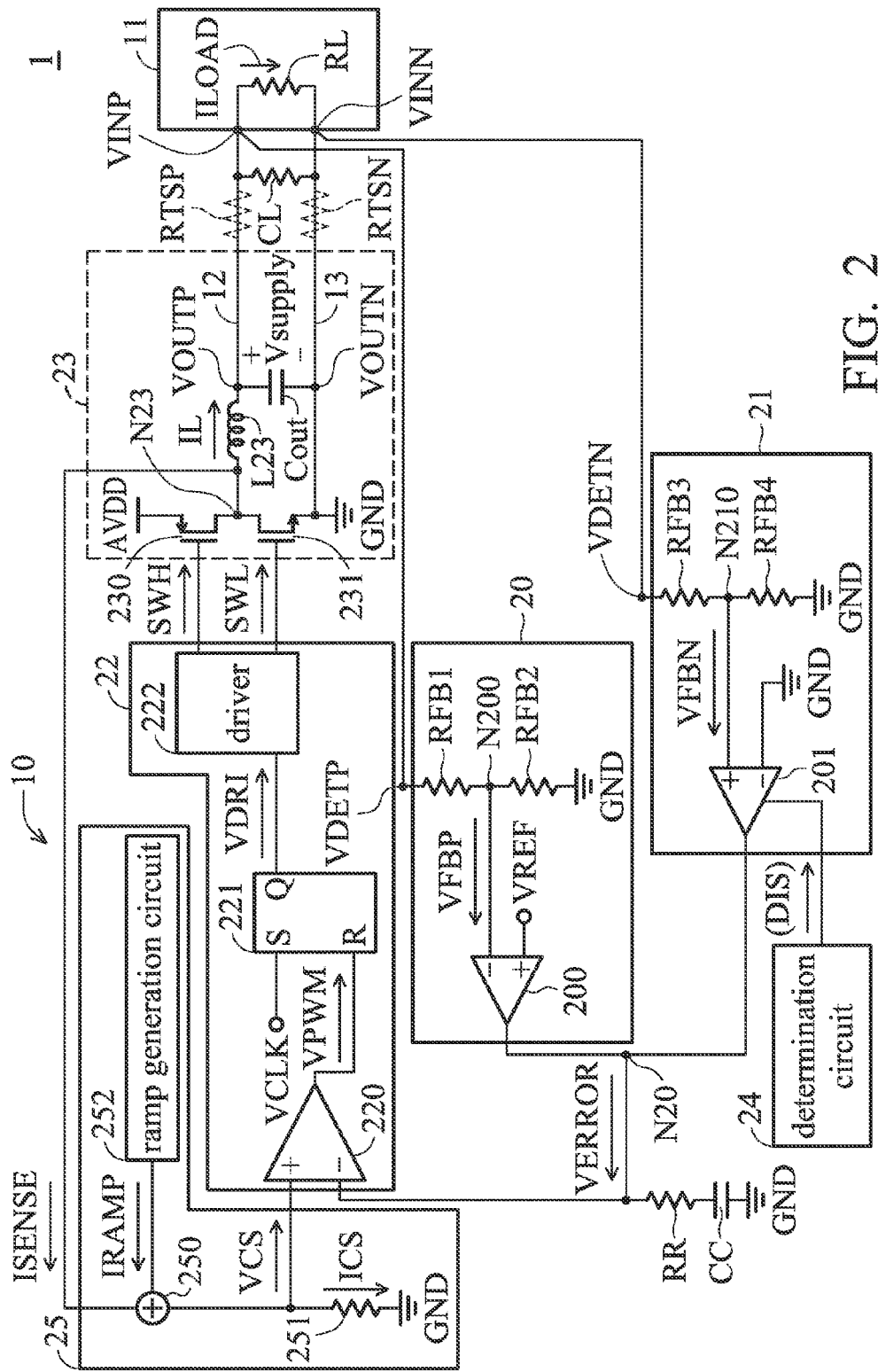
FIG. 2 shows an exemplary embodiment of a voltage supplier.

FIG. 2 shows an exemplary embodiment of circuit structures of the power supplier 10 and the load 11. In FIG. 2, a resistor RL represents the equivalent resistance of the load 11, and a current ILOAD is the current following through the resistor RL. The power supplier 10 comprises error amplification circuits 20 and 21, a pulse width modulation (PWM) signal generator 22, a power conversion circuit 23, a determination circuit 24, and a current detection circuit 25. The power supplier 10 transmits the supply voltage Vsupply to the load 11 through the power lines 12 and 13. There is a capacitor CL between the position voltage input terminal VINP and the negative voltage input terminal VINN of the load 11. The capacitor CL is used to hold the supply voltage Vsupply received by the load 11. In the power supplier 10, the error amplification circuit 20 comprises an error amplifier 200 and a voltage divisor composed of resistors RFB1 and RFB2. The resistors RFB1 and RFB2 of the voltage divisor are coupled in series between the positive voltage detection terminal VDETP and a ground GND. The voltage at the positive voltage input terminal VINP of the load 11 is transmitted to the positive voltage detection terminal VDETP, and a positive voltage signal VFBP is generated at the joint node N200 between the resistors RFB1 and RFB2 by performing a voltage-division operation of the voltage divisor to the voltage at the positive voltage input terminal VINP. The positive input terminal (+) of the error amplifier 200 receives a reference voltage VREF, and the negative input terminal (−) thereof is coupled to the joint node N200 to receive the positive voltage signal VFBP. The error amplifier 200 performs an error detection operation to detect the difference between the positive voltage signal VFBP and the reference VFB. The output terminal of the error amplifier 200 is coupled to the node N20. The error amplification circuit 21 comprises an error amplifier 210 and a voltage divisor composed of resistors RFB3 and RFB4. The resistors RFB3 and RFB4 of the voltage divisor are coupled in series between the negative voltage detection terminal VDETN and the ground GND. The voltage at the negative voltage input terminal VINN of the load 11 is transmitted to the negative voltage detection terminal VDETN, and a negative voltage signal VFBN is generated at the joint node N210 between the resistors RFB3 and RFB4 by performing a voltage-division operation of the voltage divisor to the voltage at the negative voltage input terminal VINN. The positive input terminal (+) of the error amplifier 210 is coupled to the joint node N210 to receive the negative voltage signal VFBN, and the negative input terminal (−) thereof is coupled to the ground GND. The error amplifier 210 performs an error detection operation to detect the difference between the negative voltage signal VFBN and the voltage of the ground GND. The output terminal of the error amplifier 210 is coupled to the node N20. According to the circuit structures and operations of the error amplification circuits 20 and 21, a level of a voltage error signal VERROR at the node N20 can be varied with the difference between the positive voltage signal VFBP and the reference VFB, and also can be varied with the difference between the negative voltage signal VFBN and the voltage of the ground GND.

The PWM signal generator 22 comprises a comparator 220, a flip-flop 221, and a driver 222. The positive input terminal (+) of the comparator 220 receives a current detection signal VCS, and the negative input terminal (−) thereof receives the voltage error signal VERROR. The comparator 220 generates a PWM control signal VPWM according to the comparison result. The set terminal (S) of the flip-flop 220 receives a clock signal VCLK, the (R) thereof receives the PWM control signal VPWM, and the output terminal (Q) thereof generates a driving signal VDRI. The driver 222 receives the driving signal VDRI and generates at least one switching signal according to the driving signal VDRI. The number of switching signals is determined according to the circuit structure of the power conversion circuit 23. In the embodiment of FIG. 2, the driver 22 generates two switching signals SWH and SWL.

The power conversion circuit 23 comprises power transistors 230 and 231, an inductor L23, and a capacitor Cout.

In the embodiment, the power transistor 230 is implemented by a P-type metal semiconductor (PMOS) transistor, while the power transistor 231 is implemented by an N-type metal semiconductor (NMOS) transistor. The power transistors 230 and 231 are coupled in series between an operation voltage AVDD and the ground GND, and the gates of the power transistors 230 and 231 respectively receive the switching signals SWH and SWL. The power transistors 230 and 231 operate according to the switching signals SWH and SWL to generate a switching voltage SW at the joint node N23. The inductor L23 is charged or discharged according to the switching voltage SW to generate the supply voltage Vsupply between the positive voltage output terminal VOUTP and the negative voltage output terminal VOUTN. The capacitor Cout is coupled between the positive voltage output terminal VOUTP and the negative voltage output terminal VOUTN to hold the supply voltage Vsupply.

The current detection circuit 25 is coupled to the inductor L23 to detect the current IL flowing through the inductor L23. The current detection circuit 25 comprises a current summing circuit 250, a resistor 251, and a ramp generator circuit 252. The current detection circuit 25 generates a detection current ISENSE according to the current IL flowing through the inductor L23, and the detection current ISENSE is provided to the current summing circuit 250. The ramp generator circuit 252 generates a ramp current IRAMP. The current summing circuit 250 sums up the detection current ISENSE and the ramp current IRAMP to obtain a summed current ICS. The condition that the summed current ICS flows the resistor 251 induces the current detection signal VCS. Thus, the current detection signal VCS can represent the value of the current IL flowing through the inductor L23. The current detection signal VCS is provided to the comparator 220 and compared with the voltage error signal VERROR.

As described above, the power lines 12 and 13 have the parasitic resistances RTSP and RTSN. When a conventional power supplier provides a supply voltage to the load 11 through the power lines 12 and 13, the current flowing through the parasitic resistance RTSP or RTTN will cause a voltage drop at the positive voltage input terminal VINP or the negative voltage input terminal VINN due to the existence of the parasitic resistances RTSP and RTSN, such that there is an error in the supply voltage received by the load 11. In other words, due to the existence of the parasitic resistances RTSP and RTSN, there is a voltage error induced between the voltage which is received by the loads through the positive voltage input terminal VINP and the negative voltage input terminal VINN (the voltage is the difference (vinp−vinn) between the voltage vinp at the positive voltage input terminal VINP and the voltage vinn at the negative voltage input terminal VINN) and the supply voltage Vsupply which is generated by the power supplier 10. As shown in FIG. 3A, when the voltage vinn at the negative input terminal VINN is increased due to the voltage drop Vdrop, voltage drop also occurs in the voltage (=vinp−vinn) received by the load 11, which results in the load 11 not being able to receive the correct and proper voltage. According to the embodiment, the error amplifiers 200 and 201 of the power supplier 10 can determine whether voltage drop occurs by detecting the voltage vinp at the positive voltage input terminal VINP and the voltage vinn at the negative voltage input terminal VINN. When the voltage drop occurs, the power supplier 10 can adjust the supply voltage Vsupply by modulating the duty cycles of the switching signals SWH and SWL for compensating for the voltage error induced by the voltage drop.

Figure 3B:
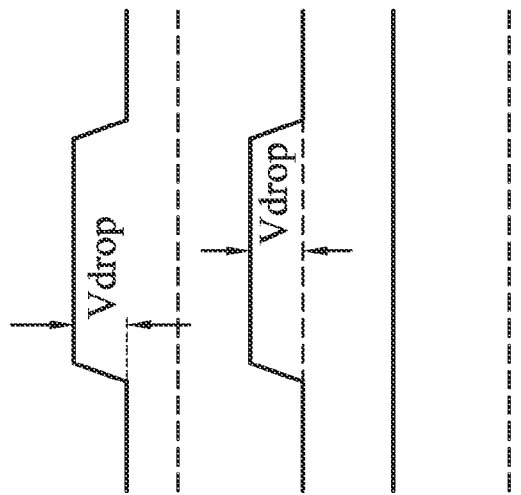
FIG. 3B is a schematic diagram showing compensation for voltage drop according to an exemplary embodiment.
Figure 3A:
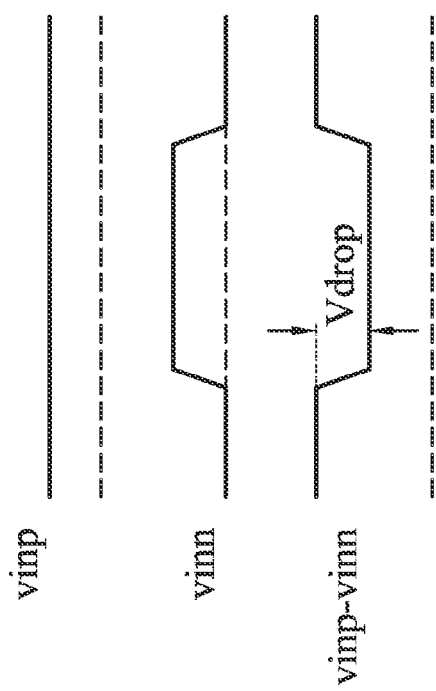
FIG. 3A is a schematic diagram showing voltage drop at a voltage input terminal of a load which occurs due to the parasitic resistance of power lines.

Referring to FIGS. 2 and 3B, for example, when the voltage vinn at the negative input terminal VINN is increased according to the voltage drop caused by the parasitic resistance RTTN of the power line 13, the negative voltage signal VFBN at the joint node N210 is increased. At this time, the error amplifier 210 detects that there is difference between the negative voltage signal VFBN and the voltage of the ground GND, and the level of the voltage error signal VERROR is increased according to the difference between the negative voltage signal VFBN and the voltage of the ground GND. Through the operations of the comparator 220, the flip-flip 221 and the drier 222, the duty cycles of the switching signals SWH and SWL are increased according to the increment of the level of the voltage error signal VERROR. With the increment of the duty cycles of the switching signals SWH and SWL, the supply voltage Vsupply is increased. Through the power line 12, the voltage vinp at the positive voltage input terminal VINP is thus increased. According to the above description, the error amplifier 210 detects the difference between the negative voltage signal VFBN and the level of the ground GND by performing the error detection operation, and, through the operations of the PWM signal generator 22 and the power conversion circuit 23, the increased magnitude of the voltage vinp is equal to the voltage drop Vdrop of the voltage vinn. Accordingly, for the load 11, the voltage (vinp−vinn) received by the load 11 through the positive voltage input terminal VINP and the negative voltage input terminal VINN is not varied with the voltage drop Vdrop (that is the received voltage is kept at the desired level), and the load 11 receives the correct and proper voltage.

According to the embodiment of FIG. 2, the voltage vinp at the positive voltage input terminal VINP is divided by the resistors REF1 and REF2, and then an error amplifying operation is performed on the voltage which is obtained after the voltage division. The voltage vinn at the negative voltage input terminal VINN is divided by the resistors REF3 and REF4, and then an error amplifying operation is performed on the voltage which is obtained after the voltage division. Two independent feedback paths are formed. Thus, there is no current sharing effect occurred between the resistors RFB1 and RFB2 on one feedback path and the resistors RFB3 and RFB4 on the other feedback path. The resistors RFB1-RFB4 can be implemented by small resistors, which can reduce the area of the power supplier 10. Moreover, since the positive voltage input terminal VINP and the negative voltage input terminal VINN are coupled to two respective independent feedback paths, the amplification circuits 20 and 21 can modulate the duty cycle of the switching signals SWH and SWL quickly in response to voltage drop, thereby timely adjusting the supply voltage Vsupply.

According to one embodiment, in a light-load condition, the error amplification circuit 21 related to the negative voltage input terminal VINN can be disabled for increasing the usage efficiency of the power supplier 10. As shown in FIG. 2, the determination circuit 24 of the power supplier 10 operates to determine whether the load 11 is a light load. When the determination circuit 24 determines that the load 11 is a light load, the determination circuit 24 generates a disable signal DIS to disable the error amplifier 221, such that the error amplifier 122 does not operate. Accordingly, when the load 11 is a light load, only the error amplification circuit 20 operates, such that the shifting voltage of the error amplifier 210 is not increased, and the accuracy of the error detection is enhanced. In an embodiment, the determination circuit 24 can determine whether the load 11 is a light load according to the current IL flowing through the inductor L23. For example when the current IL flowing through the inductor L23 is larger, the determination circuit 24 determines that the load 11 is not a light load (that is, the load 11 is a heavy load). At this time, the determination circuit 24 does not generate the disable signal DIS, and the error amplifier 211 can operate. When the current IL flowing through the inductor L23 is smaller, the determination circuit 24 determines that the load 11 is a light load. At this time, the determination circuit 24 generates the disable signal DIS to disable the error amplifier 211.

Figure 4:
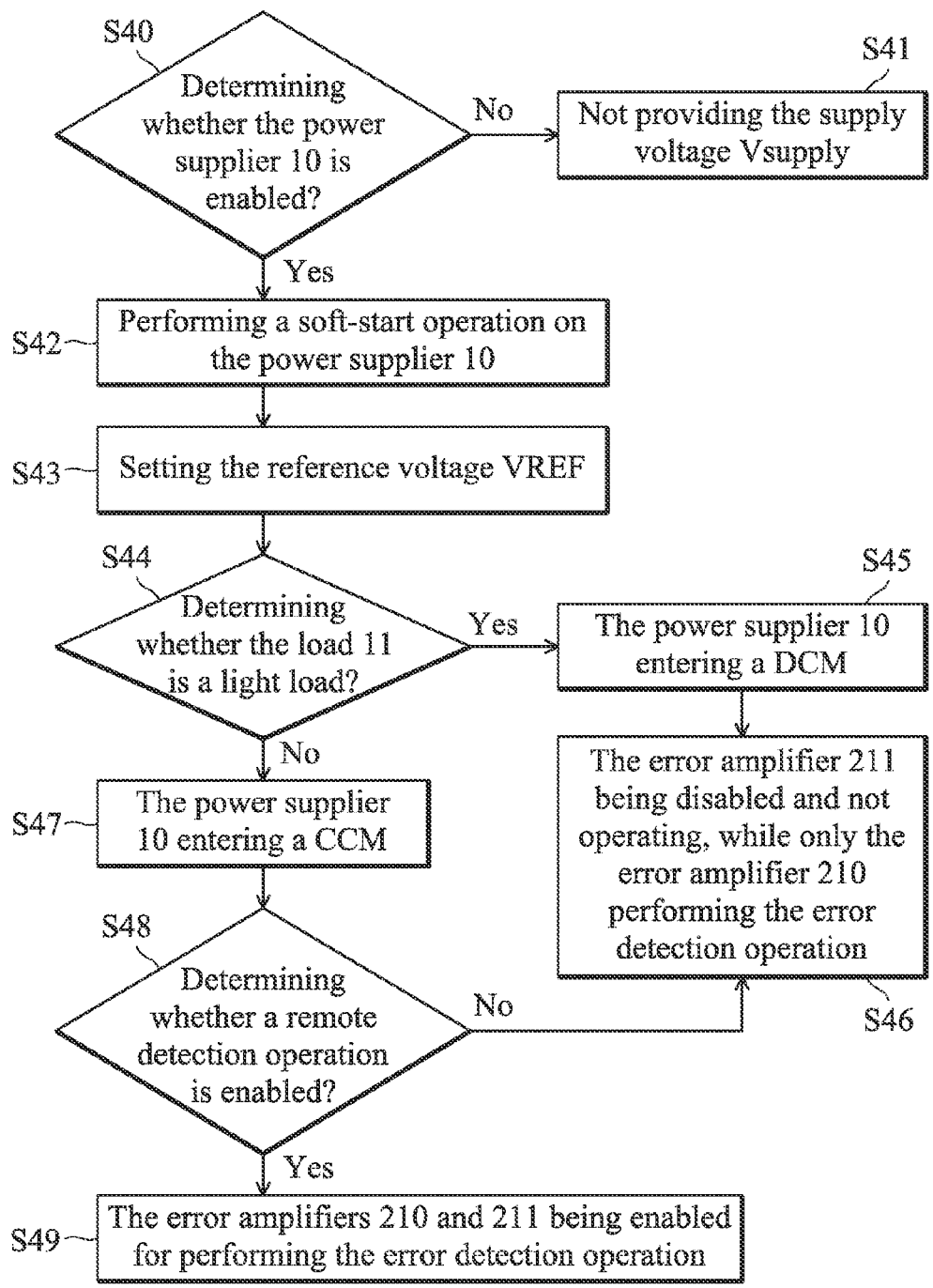
FIG. 4 is a flow chart of an exemplary embodiment of a voltage adjustment method.

FIG. 4 is a flow chart of an exemplary embodiment of a voltage adjustment method. In the following, the voltage adjustment method will be illustrated by referring to FIGS. 2 and 4. First, it is determined whether the power supplier 10 is enabled (step S40). When the power supplier 10 is not enabled, the power supplier 10 does not operate and provide the supply voltage Vsupply (step S41). When the power supplier 10 is enabled, a soft-start operation is performed on the power supplier 10 (step S42). During the soft-start operation, the reference voltage VREF, which is provided to the error amplifier 200, is increased slowly toward a predetermined level (step S43). When the voltage 10 is at a stable state, the level of the negative voltage signal VFBN is equal to the level of the reference voltage VREF. After, the determination circuit 24 determines whether the load 11 is a light load according to the current IL flowing through the inductor L23 (step S44). When it is determined that the load 11 is a light load, the power supplier 10 enters a discontinuous current mode (DCM) to generate the supply voltage Vsupply (step S45). At the discontinuous current mode, the error amplifier 211 is disabled and does not operate, while only the error amplifier 210 performs the error detection operation (step S46), such that the modulation of the duty cycle of the switching signals SWH and SWL is performed according to the voltage at the positive voltage input terminal VINP. At this time, when there is voltage drop occurring in the voltage at the positive voltage input terminal VINP, the duty cycle of the switching signals SWH and SWL is modulated according to the above operations, thereby adjusting the supply voltage Vsupply. Thus, the voltage difference (vinp−vinn) between the positive voltage input terminal VINP and the negative voltage input terminal VINN is kept at the predetermined level.

When it is determined that the load 11 is not a light load, the power supplier 10 enters a continuous current mode (CCM) to generate the supply voltage Vsupply (step S47). At the continuous current mode, it is determined whether a remote detection operation is enabled (step S48). When it is determined that the remote detection operation is not enabled, the method proceeds to the step S46. When it is determined that the remote detection operation is enabled, in some cases, the error amplifier 210 performs the error detection operation, such that the modulation of the duty cycle of the switching signals SWH and SWL is performed according to the voltage at the positive voltage input terminal VINP, or in some cases, the error amplifier 211 performs the error detection operation, such that the modulation of the duty cycle of the switching signals SWH and SWL is performed according to the voltage at the positive voltage input terminal VINN (step S49). During the remote detection operation, when there is voltage drop occurring in the voltage at the positive voltage input terminal VINP, the duty cycle of the switching signals SWH and SWL is modulated according to the above operations, thereby adjusting the supply voltage Vsupply. Thus, the voltage difference (vinp−vinn) between the positive voltage input terminal VINP and the negative voltage input terminal VINN can kept at the predetermined level. In another embodiment, during the remote detection operation, when there is voltage drop occurring in the voltage at the positive voltage input terminal VINN, the duty cycle of the switching signals SWH and SWL is modulated according to the above operations, thereby adjusting the supply voltage Vsupply. Thus, the voltage difference (vinp−vinn) between the positive voltage input terminal VINP and the negative voltage input terminal VINN can kept at the predetermined level.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supplier for generating a supply voltage between a positive voltage output terminal and a negative voltage output terminal comprising:
   a pulse width modulation (PWM) signal generator generating at least one switching signal according to a voltage error signal;
   a power conversion circuit coupled to the positive voltage output terminal and the negative voltage output terminal and comprising an inductor, wherein the power conversion circuit generates a switching voltage to the inductor according to the at least one switching signal so as to generate the supply voltage between the positive voltage output terminal and the negative voltage output terminal;
   a first error amplifier having a positive input terminal receiving a reference voltage and a negative input terminal receiving a positive voltage signal and detecting difference between the positive voltage signal and the reference voltage, wherein an output terminal of the first error amplifier is coupled to a first node; and
   a second error amplifier having a positive input terminal receiving a negative voltage signal and a negative input terminal receiving a ground voltage and detecting difference between the negative voltage signal and the ground voltage, wherein an output terminal of the second error amplifier is coupled to the first node,
   wherein the voltage error signal is generated at the first node, and the PWM signal generator modulates a duty cycle of the at least one switching signal according to a variation of the voltage error signal, and
   wherein a level of the voltage error signal is varied based on the detected difference between the negative voltage signal and the ground voltage.

2. The power supplier as claimed in claim 1, wherein the PWM signal generator comprises:
   a comparator having a positive input terminal receiving a current detection signal and a negative input terminal coupled to the first node for receiving the voltage error signal and generating a PWM control signal according to the voltage error signal and the current detection signal for modulating the duty cycle of the at least one switching signal,
   wherein the current detection signal represents a value of a current flowing through the inductor.

3. The power supplier as claimed in claim 2, wherein the PWM signal generator further comprises:

a flip-flop having a clock terminal receiving a clock signal, a reset terminal receiving the PWM control signal, and an output terminal generating a driving signal; and a driver receiving the driving signal and generating the at least one switching signal according to the driving signal.

4. The power supplier as claimed in claim 1, further comprising:

a determination circuit determining whether the supply voltage is provided to a light load according to a current following through the inductor, wherein when the determination circuit determines that the supply voltage is provided to the light load, the second error amplifier is disabled and does not operate.

5. The power supplier as claimed in claim 1, wherein the level of the voltage error signal is increased for increasing a pulse of the at least one switching signal.

6. The power supplier as claimed in claim 1, wherein a level of the voltage error signal is varied based on the detected difference between the positive voltage signal and the reference voltage.

7. A power supply system comprising:

a load having a positive voltage input terminal and a negative voltage input terminal; and a power supplier generating a supply voltage between a positive voltage output terminal and a negative voltage output terminal of the power supplier, wherein the positive voltage output terminal and the negative voltage output terminal of the power supplier are respectively coupled to the positive voltage input terminal and the negative voltage input terminal of the load, and the power supplier comprises:

a pulse width modulation (PWM) signal generator generating at least one switching signal according to a voltage error signal;

a power conversion circuit coupled to the positive voltage output terminal and the negative voltage output terminal and comprising an inductor, wherein the power conversion circuit generates a switching voltage to the inductor according to the at least one switching signal so as to generate the supply voltage between the positive voltage output terminal and the negative voltage output terminal;

a first error amplifier having a positive input terminal receiving a reference voltage and a negative input terminal receiving a positive voltage signal and detecting difference between the positive voltage signal and the reference voltage, wherein the positive voltage signal is related to a voltage at the positive voltage input terminal of the load, and an output terminal of the first error amplifier is coupled to a first node; and a second error amplifier having a positive input terminal receiving a negative voltage signal and a negative input terminal receiving a ground voltage and detecting difference between the negative voltage signal and the ground voltage, wherein the negative voltage signal is related to a voltage at the negative voltage input terminal of the load, and an output terminal of the second error amplifier is coupled to the first node, wherein the voltage error signal is generated at the first node, and the PWM signal generator modulates a duty cycle of the at least one switching signal according to a variation of the voltage error signal, and wherein a level of the voltage error signal is varied based on the detected difference between the negative voltage signal and the ground voltage.

8. The power supply system as claimed in claim 7, wherein the PWM signal generator comprises:

a comparator having a positive input terminal receiving a current detection signal and a negative input terminal coupled to the first node for receiving the voltage error signal and generating a PWM control signal according to the voltage error signal and the current detection signal for modulating the duty cycle of the at least one switching signal, wherein the current detection signal represents a value of a current flowing through the inductor.

9. The power supply system as claimed in claim 8, wherein the PWM signal generator further comprises:

a flip-flop having a clock terminal receiving a clock signal, a reset terminal receiving the PWM control signal, and an output terminal generating a driving signal; and a driver receiving the driving signal and generating the at least one switching signal according to the driving signal.

10. The power supply system as claimed in claim 7, further comprising:

a determination circuit determining whether the supply voltage is provided to a light load according to a current following through the inductor, wherein when the determination circuit determines that the supply voltage is provided to the light load, the second error amplifier is disabled and does not operate.

11. The power supply system as claimed in claim 7, wherein the level of the voltage error signal is increased for increasing a pulse of the at least one switching signal.

12. The power supply system as claimed in claim 7, wherein a level of the voltage error signal is varied based on the detected difference between the positive voltage signal and the reference voltage.

13. A voltage adjustment method for adjusting a supply voltage, wherein a power supply generates the supply voltage between a positive voltage output terminal and a negative voltage output terminal of the power supply, a positive voltage input terminal and a negative voltage input terminal of a load are respectively coupled to the positive voltage output terminal and the negative voltage output terminal of the power supply, and the voltage adjustment method comprises:

performing a soft-start operation on the power supplier to generate the supply voltage;

determining whether the load is a light load;

the power supplier entering a continuous current mode when it is determined that the load is not the light load;

at the continuous current mode, determining whether a remote detection operation is enabled;

when the remote detection operation is enabled, and when there is voltage drop occurring in the negative voltage input terminal, modulating a duty cycle of at least one switching signal so as to adjust the supply voltage, thereby keeping voltage difference between the positive voltage input terminal and the negative voltage input terminal of the load at a predetermined level, wherein the duty cycle is modulated according to an increment of a level of a voltage error signal, and the level of the voltage error signal is varied based on a detected difference between a negative voltage signal and a ground voltage.

14. The voltage adjustment method claimed in claim 13, further comprising:
- the power supplier entering a discontinuous current mode when it is determined that the load is the light load;
- at the continuous current mode, when there is voltage drop occurring in the positive voltage input terminal, modulating the duty cycle of the at least one switching signal so as to adjust the supply voltage, thereby keeping the voltage difference between the positive voltage input terminal and the negative voltage input terminal of the load at the predetermined level.

15. The voltage adjustment method claimed in claim 13, further comprising:
- at the continuous current mode, when there is voltage drop occurring in the positive voltage input terminal, modulating the duty cycle of the at least one switching signal so as to adjust the supply voltage, thereby keeping voltage difference between the positive voltage input terminal and the negative voltage input terminal of the load at the predetermined level.

* * * * *